United States Patent
Marlett et al.

(10) Patent No.: US 9,657,634 B2
(45) Date of Patent: May 23, 2017

(54) TURBOCHARGER CONTROLLER

(71) Applicant: GM Global Technology Operations LLC, Detroit, MI (US)

(72) Inventors: Chad E. Marlett, Plymouth, MI (US); Francesco Castorina, Turin (IT); Joseph Zammit, Livonia, MI (US); Yun Xiao, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 380 days.

(21) Appl. No.: 14/067,430

(22) Filed: Oct. 30, 2013

(65) Prior Publication Data

US 2015/0113981 A1 Apr. 30, 2015

(51) Int. Cl.
*F02B 37/12* (2006.01)
*F02D 41/00* (2006.01)
*F02D 41/18* (2006.01)
*F02D 41/24* (2006.01)
*F02B 39/16* (2006.01)

(52) U.S. Cl.
CPC .......... *F02B 37/12* (2013.01); *F02D 41/0007* (2013.01); *F02D 41/18* (2013.01); *F02D 41/2448* (2013.01); *F02B 2039/164* (2013.01); *F02D 2200/0406* (2013.01); *F02D 2200/0414* (2013.01); *Y02T 10/144* (2013.01)

(58) Field of Classification Search
CPC .......... F02B 37/00; F02B 33/44; F02B 37/12; F02D 41/0007; F02C 6/12
USPC ................. 60/605.1, 611; 701/101, 102, 114
See application file for complete search history.

(56) References Cited

U.S. PATENT DOCUMENTS

| | | | | |
|---|---|---|---|---|
| 5,604,306 | A * | 2/1997 | Schricker | B01D 46/0086 116/DIG. 25 |
| 6,401,457 | B1 * | 6/2002 | Wang | F02B 37/18 123/568.21 |
| 6,698,203 | B2 * | 3/2004 | Wang | 60/611 |
| 7,007,472 | B2 * | 3/2006 | Baize | F02D 23/00 60/602 |
| 7,444,234 | B2 * | 10/2008 | Bauerle | F02M 35/09 123/361 |
| 7,937,996 | B2 * | 5/2011 | He | F02D 41/0007 73/114.77 |
| 8,397,500 | B2 * | 3/2013 | Andrasko | F02D 23/00 60/605.1 |

(Continued)

*Primary Examiner* — Thai Ba Trieu
*Assistant Examiner* — Jessica Kebea
(74) *Attorney, Agent, or Firm* — Cantor Colburn LLP

(57) ABSTRACT

A turbocharger controller includes a turbocharger compressor temperature module having a compressor inlet air temperature input, and a turbocharger compressor pressure module including a compressor inlet pressure input and a compressor outlet pressure input. A memory module includes a compressor outlet temperature calibration map and a compressor pressure ratio look-up table. A turbocharger boost pressure ratio control module is operatively connected to the turbocharger compressor temperature module, the turbocharger compressor pressure module, and the memory module. The turbocharger boost pressure ratio control module is configured to selectively compare compressor outlet pressure and compressor inlet pressure with values in the compressor ratio look-up table to determine a turbocharger boost pressure set point establishing a desired compressor outlet temperature.

15 Claims, 3 Drawing Sheets

(56) References Cited

U.S. PATENT DOCUMENTS

| | | | |
|---|---|---|---|
| 8,892,332 B2* | 11/2014 | Chi | F02D 28/00 |
| | | | 60/605.2 |
| 2004/0178895 A1* | 9/2004 | Pontius | F02B 77/04 |
| | | | 340/439 |
| 2009/0024295 A1* | 1/2009 | Swenson | G01F 9/02 |
| | | | 701/100 |
| 2009/0071148 A1* | 3/2009 | Shu et al. | 60/599 |
| 2009/0314082 A1* | 12/2009 | Sujan et al. | 73/497 |
| 2011/0005223 A1* | 1/2011 | Kawabe | F02B 37/00 |
| | | | 60/606 |

\* cited by examiner

TURBOCHARGER CONTROLLER

FIELD OF THE INVENTION

The subject invention relates to the art of motor vehicles including a turbocharger and, more particularly, to a turbocharger controller.

BACKGROUND

Motor vehicles include various controllers that establish operating parameters targeted to lower emissions. Fuel injection timing, fuel injection quantity, engine timing, and the like are controlled such that emissions from the motor vehicle remain within desired targeted limits. In vehicles that include a turbocharger, boost pressure may be controlled to maintain compressor outlet temperatures which have an effect on emissions. Generally, turbocharger boost pressure ratio is set for worst case scenario conditions. Boost pressure set points are generally chosen to meet worst case scenario conditions to protect the turbocharger from severe conditions. Once set, the boost pressure ratio is continuously evaluated for unexpected interactions with other motor vehicle parameters.

Currently, many turbocharger controllers may include up to twenty-eight boost pressure set point maps. Boost pressure ratio, compressor out temperature, and other parameters are compared to programmed boost pressure set points stored in the boost pressure ratio maps. However, programmed set points are inflexible and not readily adjustable to meet real time conditions. Accordingly, it is desirable to provide a turbocharger controller with logic that can control turbocharger boost pressure to accommodate real time conditions to enhance turbocharger performance.

SUMMARY OF THE INVENTION

In accordance with an exemplary embodiment, a turbocharger controller includes a turbocharger compressor temperature module having a compressor inlet air temperature input, and a turbocharger compressor pressure module including a compressor inlet pressure input and a compressor outlet pressure input. A memory module includes a compressor outlet temperature calibration map and a compressor pressure ratio look-up table. A turbocharger boost pressure ratio control module is operatively connected to the turbocharger compressor temperature module, the turbocharger compressor pressure module, and the memory module. The turbocharger boost pressure ratio control module is configured to selectively compare compressor outlet pressure and compressor inlet pressure with values in the compressor ratio look-up table to determine a turbocharger boost pressure set point establishing a desired compressor outlet temperature.

In accordance with another exemplary embodiment, an internal combustion engine includes an engine block, an exhaust system fluidically connected to the engine block, and a turbocharger fluidically connected to the exhaust system. The turbocharger includes a compressor portion including a compressor air inlet temperature sensor, a compressor inlet air pressure sensor, and a compressor outlet air pressure sensor. A turbocharger controller is operatively connected to the turbocharger. The turbocharger controller includes a turbocharger compressor temperature module including a compressor inlet air temperature input operatively connected to the compressor air inlet temperature sensor, a turbocharger compressor pressure module including a compressor inlet pressure input operatively connected to the compressor inlet air pressure sensor and a compressor outlet pressure input operatively connected to the compressor outlet air pressure sensor. A memory module includes a compressor outlet temperature calibration map and a compressor pressure ratio look-up table. A turbocharger boost pressure ratio control module is operatively connected to the turbocharger compressor temperature module, turbocharger compressor pressure module and the memory module. The turbocharger boost pressure ratio control module is configured to selectively compare compressor outlet pressure and compressor inlet pressure with values in the compressor ratio look-up table to determine a turbocharger boost pressure set point establishing a desired compressor outlet temperature.

In yet another exemplary embodiment of the invention, a method of controlling turbocharger compressor outlet temperature includes sensing compressor inlet air temperature of a turbocharger compressor, selecting a desired compressor outlet air temperature, determining a compressor pressure ratio from a compressor pressure ratio look-up table to achieve the desired compressor temperature ratio, and setting a boost pressure set point to establish the compressor pressure ratio for the turbocharger compressor that establishes the desired compressor outlet temperature.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
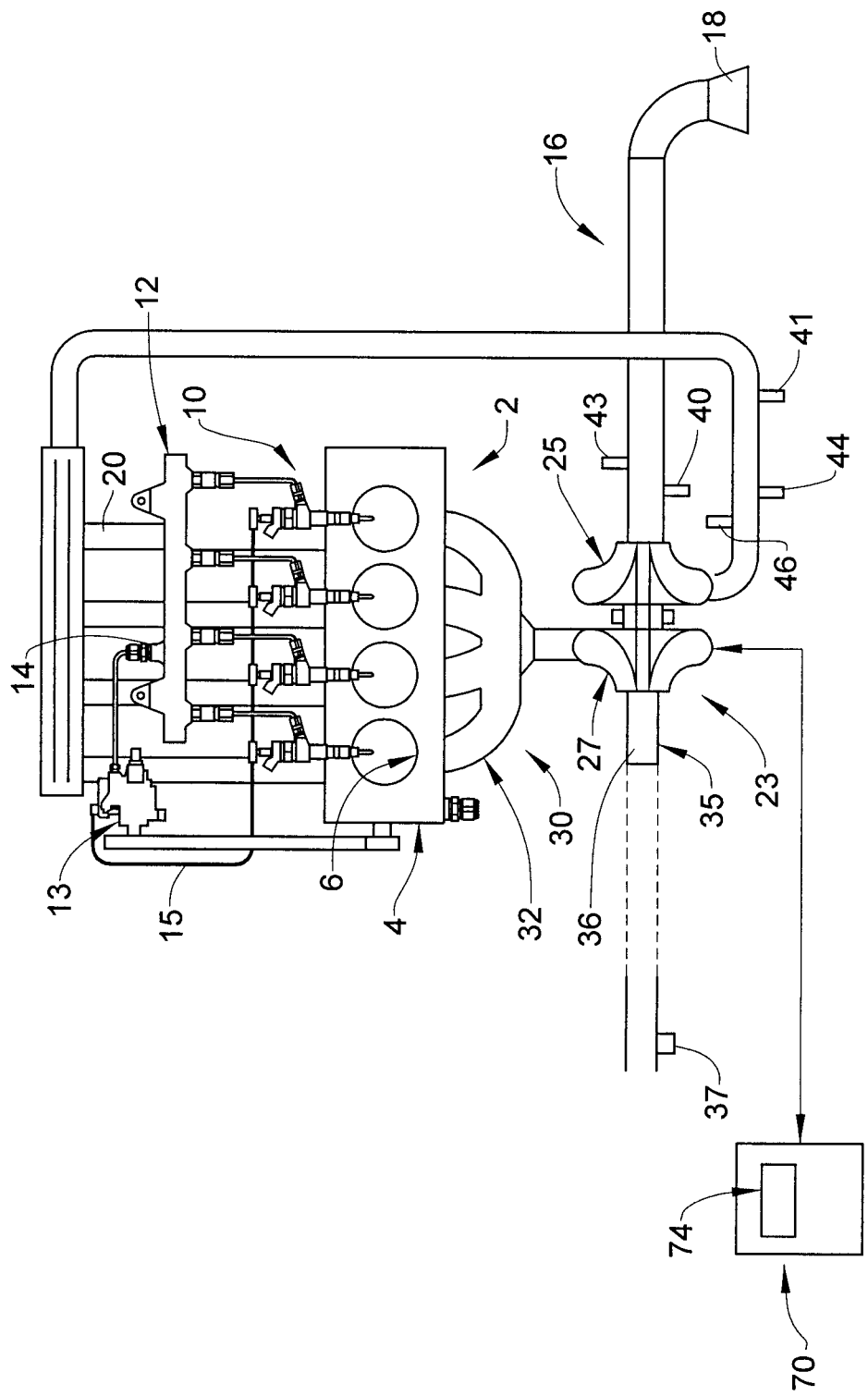
FIG. 1 is a schematic view of an internal combustion engine including a turbocharger controller, in accordance with an exemplary embodiment.

The following description is merely exemplary in nature and is not intended to limit the present disclosure, its application or uses. It should be understood that throughout the drawings, corresponding reference numerals indicate like or corresponding parts and features. An internal combustion engine is indicated generally at 2, in FIG. 1. Internal combustion engine 2 includes an engine block 4 provided with a number of piston cylinders, one of which is indicated at 6. Engine block 4 also includes an engine head (not shown) that is mounted across cylinders 6. Internal combustion engine 2 also includes a plurality of fuel injectors, one of which is indicated at 10, that may be supported in the cylinder head. Fuel injectors 10 are fluidically connected to a fuel injection manifold 12. Fuel injection manifold 12 includes a fuel injection controller 13 that delivers fuel to fuel injectors 10 through a fuel inlet 14. Fuel injection controller 13 also controls fuel injection timing and/or fuel injection quantity through a control lead 15.

Internal combustion engine 2 also includes an air intake system 16 fluidically connected to engine block 4. Air intake system 16 includes an air inlet 18 that delivers air to a plurality of discharge conduits 20 fluidically connected to engine block 4 (typically to the engine cylinder head). Air intake system 16 also includes a turbocharger 23 having a compressor portion 25 and a turbine portion 27. Compressor portion 25 is fluidically connected between air inlet 18 and discharge conduits 20. Turbine portion 27 is fluidically connected to an exhaust system 30. Exhaust gases passing through exhaust system 30 drive turbine portion 27. Turbine portion 27 drives compressor portion 25 to compress inlet air passing through air intake system 16. Exhaust system 30 includes an exhaust manifold 32 fluidically connected to engine block 4, typically through the cylinder head, and an exhaust outlet 34 that delivers exhaust gases to turbocharger 23. Exhaust gases pass from an outlet 35 of turbine portion 27 through an exhaust conduit 36 to one or more emissions reduction devices (not shown). A NOx sensor 37, that senses NOx levels in exhaust gases passing from turbine outlet 35, is arranged downstream of the one or more emissions reduction devices.

Air intake system 16 includes a compressor inlet air temperature sensor 40 arranged upstream of compressor portion 25 and a compressor outlet air temperature sensor 41 arranged downstream of compressor portion 25. Additionally, a compressor inlet air pressure sensor 43 is arranged upstream of compressor portion 25 and a compressor outlet air pressure sensor 44 is arranged downstream of compressor portion 25. At this point it should be understood that compressor inlet air temperature sensor 40 and compressor inlet air pressure sensor 43 may be combined into a single sensor. Similarly, compressor outlet air temperature sensor 41 and compressor outlet air pressure sensor 44 may be combined into a single sensor. Further, air intake system 16 may also include an air flow sensor 46 that detects air flow volume and/or velocity through compressor portion 25.

In accordance with an exemplary embodiment, internal combustion engine 2 includes a turbocharger controller 70 that establishes a boost pressure set point for turbocharger 23. The boost pressure set point is selectively established based on compressor inlet air temperature and a compressor pressure ratio. In this manner, turbocharger controller 70 provides enhanced turbocharger control that takes into account real time conditions to enhance turbocharger efficiency while, at the same time, ensuring that turbocharger 23 is protected from damage that may result from an out of limit compressor outlet air temperature.

Figure 2:
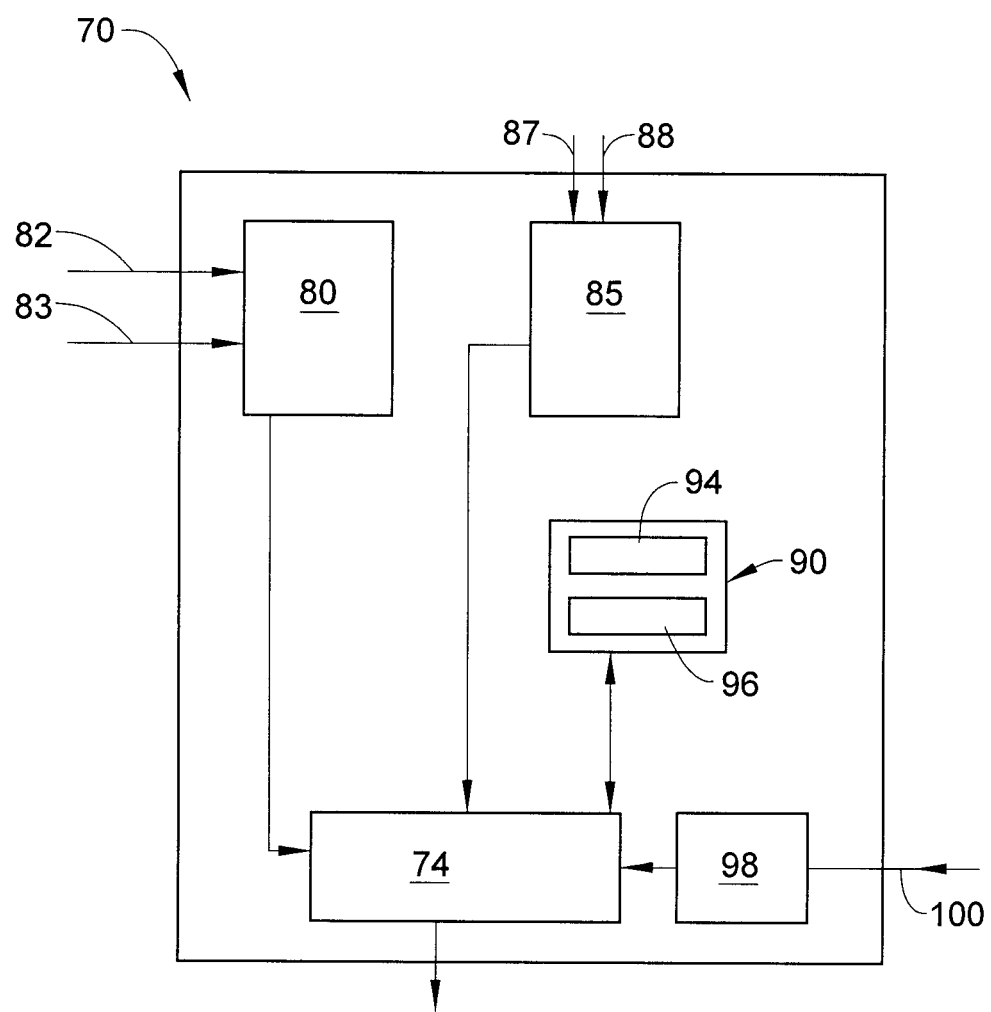
FIG. 2 is a data flow diagram illustrating the turbocharger controller of FIG. 1.

FIG. 2 is an illustration of a dataflow diagram that illustrates various elements that may be embedded within the turbocharger. Various embodiments of turbocharger controller 70 of FIG. 1, according to the present disclosure, may include any number of sub-modules that may be combined or further partitioned as well. Turbocharger controller 70 includes a turbocharger boost pressure ratio control module 74 that includes various algorithms that, when implemented, establishes a boost pressure set point for turbocharger 23.

Turbocharger controller 70 also includes a turbocharger compressor temperature module 80 operatively connected to boost pressure ratio control module 74. Turbocharger compressor temperature module 80 includes a compressor inlet air temperature input 82 operatively connected to compressor inlet air temperature sensor 40 (FIG. 1) and a compressor outlet air temperature input 83 operatively connected to compressor outlet air temperature sensor 41. (FIG. 1). Turbocharger controller 70 further includes a turbocharger compressor pressure module 85 operatively connected to turbocharger boost pressure ratio control module 74. Turbocharger compressor pressure module 85 includes a compressor inlet air pressure input 87 operatively connected to compressor inlet air pressure sensor 43 (FIG. 1) and a compressor outlet air pressure input 88 operatively connected to compressor outlet air pressure sensor 44.

In further accordance with an exemplary embodiment, turbocharger controller 70 includes a memory module 90 operatively connected to boost pressure ratio control module 74. Memory module 90 stores a compressor outlet temperature calibration map 94 and a compressor pressure ratio look-up table 96. In addition, turbocharger controller 70 includes a compressor air flow module 98 having a compressor air flow input 100 operatively connected to compressor air flow sensor 46. As will be discussed more fully below, turbocharger controller 70 sets a boost pressure set point based on current ambient conditions and turbocharger efficiency. Further, turbocharger controller 70 will adjust the boost pressure set point based on sensed compressor outlet air temperature and air flow through compressor portion 25.

Figure 3:
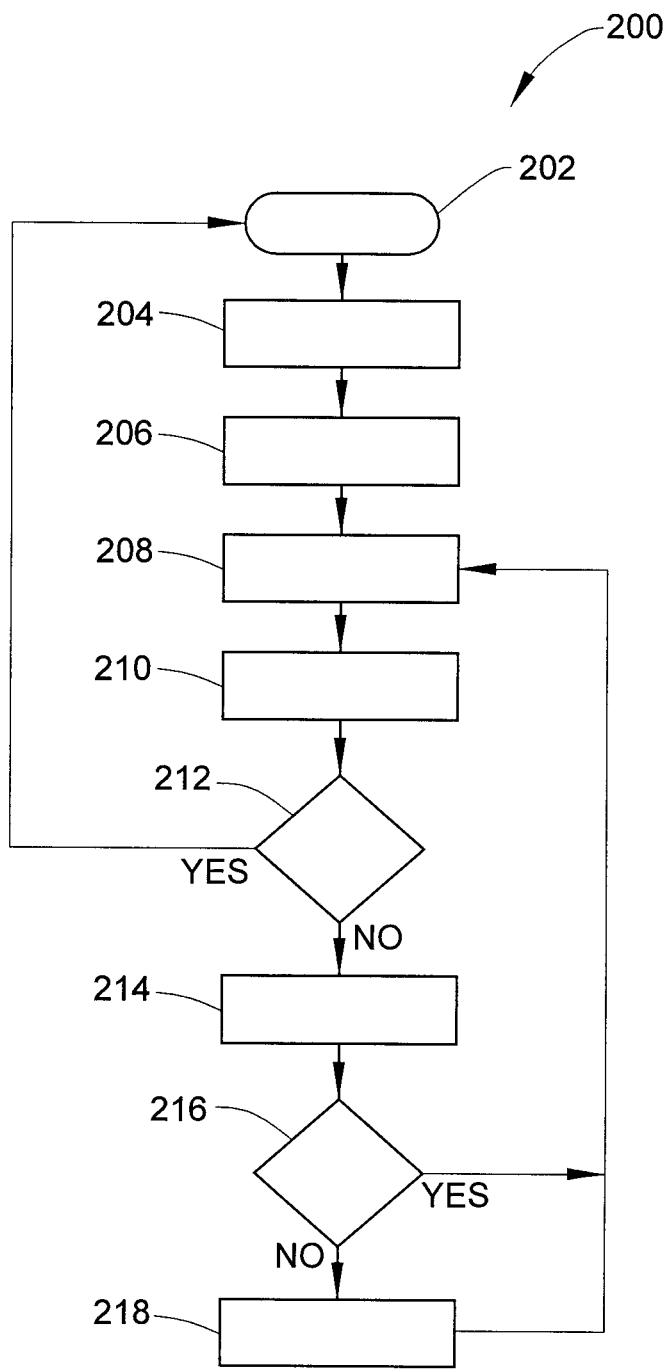
FIG. 3 is a flow diagram illustrating a method of controlling turbocharger boost pressure, in accordance with an exemplary embodiment.

Reference will now follow to FIG. 3 in describing a method 200 of controlling turbocharger 23, in accordance with an exemplary embodiment. Method 200 begins in block 202 upon detecting operation of turbocharger 23. In block 204, compressor inlet air temperature is sent to turbocharger controller 70. In block 206, compressor inlet air pressure and compressor outlet air pressure are passed to controller 70 to determine a compressor pressure ratio. Turbocharger boost pressure ratio control module 74 determines a desired compressor outlet air temperature from compressor outlet temperature calibration map 94 based on compressor inlet air temperature and the compressor pressure ratio in block 208. In block 210, compressor boost pressure ratio module 74 sets the boost pressure set point for turbocharger 23.

In block 212, turbocharger controller 70 receives a compressor outlet air temperature signal indicating compressor outlet air temperature and a determination is made, in block 212, whether sensed compressor outlet temperature is substantially equal to a desired compressor outlet air temperature. If the sensed compressor outlet air temperature is substantially equal, method 200 returns to step 202 to continually update the boost pressure set point to meet current conditions. In this manner, method 200 represents closed loop boost pressure control. However, if sensed compressor outlet temperature is not substantially equal to desired compressor outlet air temperature, turbocharger controller 70 senses air flow through compressor 25 in block 214.

In block 216, turbocharger controller 70 determines whether there is an air flow restriction through compressor portion 25 through inputs received from air flow sensor 46. If there is no indication of a restriction, turbocharger controller 70 calibrates compressor pressure ratio look-up table 96, in block 218, and method 200 returns to block 208 to select a boost pressure set point. If a restriction is determined to exist, method 200 returns to block 208 where turbocharger controller 70 selects a new boost pressure set point that accounts for a reduction in air flow. In this manner, turbocharger controller 70 continually updates the boost pressure set point to account for real-time operating conditions and, re-calibrates the compressor pressure ratio look-up table 96 to account for changes in turbocharger operation, efficiency and the like, such that turbocharger 23 is continuously operated at or near efficient operation parameters during operation of internal combustion engine 2.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A turbocharger controller connectable to a turbocharger comprising:
a turbocharger compressor temperature module including a compressor inlet air temperature input connectable to a compressor inlet air temperature sensor, and a compressor outlet air temperature input;
a turbocharger compressor pressure module including a compressor inlet air pressure input connectable to a compressor inlet air pressure sensor and a compressor outlet air pressure input connectable to a compressor outlet air pressure sensor;
a memory module including a compressor outlet temperature calibration map a compressor pressure ratio look-up table; and
a turbocharger boost pressure ratio control module operatively connected to the turbocharger compressor temperature module, the turbocharger compressor pressure module, and the memory module, the turbocharger boost pressure ratio control module being configured to selectively compare compressor outlet pressure and compressor inlet pressure with values in the compressor pressure ratio look-up table to determine and set a turbocharger boost pressure set point establishing a desired compressor outlet temperature of the turbocharger, selectively adjust the boost pressure set point based on sensed compressor outlet air temperature, and selectively calibrate the compressor pressure ratio look-up table based on sensed compressor outlet air temperature.

2. The turbocharger controller according to claim 1, further comprising: a compressor air flow module including at least one compressor air flow input.

3. The turbocharger controller according to claim 2, wherein the compressor air flow module is configured and disposed to determine an air flow restriction based on a change in compressor airflow input.

4. The turbocharger controller according to claim 3, wherein the turbocharger boost pressure ratio control module is configured and disposed to selectively adjust the boost pressure set point based on the air flow restriction.

5. The turbocharger controller according to claim 1, wherein the compressor pressure ratio look-up table is selectively calibrated based on sensed turbocharger parameters.

6. An internal combustion engine comprising:
an engine block;
an exhaust system fluidically connected to the engine block;
a turbocharger operatively connected to the exhaust system, the turbocharger including a compressor portion having a compressor inlet air temperature sensor, a compressor inlet air pressure sensor and a compressor outlet air pressure sensor; and
a turbocharger controller operatively connected to the turbocharger, the turbocharger controller comprising:
a turbocharger compressor temperature module including a compressor inlet air temperature input operatively connected to the compressor inlet air temperature sensor and a compressor outlet air temperature input operatively connected to a compressor outlet air temperature sensor;
a turbocharger compressor pressure module including a compressor inlet air pressure input operatively connected to the compressor inlet air pressure sensor and a compressor outlet pressure input operatively connected to the compressor outlet air pressure sensor;
a memory module including a compressor outlet air temperature calibration map and a compressor pressure ratio look-up table; and
a turbocharger boost pressure ratio control module operatively connected to the turbocharger compressor temperature module, the turbocharger compressor pressure module, and the memory module, the turbocharger boost pressure ratio control module being configured to selectively compare compressor outlet pressure and compressor inlet pressure with values in the compressor ratio look-up table to determine and set a turbocharger boost pressure set point establishing a desired compressor outlet temperature of the turbocharger, selectively adjust the boost pressure set point based on sensed compressor outlet air temperature, and selectively calibrate the compressor pressure ratio look-up table based on sensed compressor outlet air temperature.

7. The internal combustion engine according to claim 6, further comprising: an air flow sensor operatively connected to the turbocharger, wherein the turbocharger controller includes a compressor air flow module including at least one compressor air flow input operatively connected to the air flow sensor.

8. The internal combustion engine according to claim 7, wherein the compressor air flow module is configured and disposed to determine an air flow restriction based on a change in compressor air flow input.

9. The internal combustion engine according to claim 8, wherein the turbocharger boost pressure ratio control module is configured and disposed to selectively adjust the boost pressure set point based on the air flow restriction.

10. The internal combustion engine according to claim 6, wherein the compressor ratio look-up table is selectively calibrated based on sensed turbocharger parameters.

11. A method of controlling turbocharger compressor outlet temperature, the method comprising:
sensing compressor inlet air temperature of a turbocharger compressor;
sensing a compressor outlet air temperature of the turbocharger compressor;
selecting a desired compressor outlet air temperature;
determining a compressor pressure ratio from a compressor pressure ratio look-up table to achieve the desired compressor outlet air temperature;
setting a boost pressure set point to establish the compressor pressure ratio for the turbocharger compressor that establishes the desired compressor outlet air temperature;
adjusting the boost pressure set point of the turbocharger based on a sensed compressor outlet air temperature and air flow through the turbocharger compressor; and
calibrating the compressor pressure ratio look-up table based on sensed compressor outlet air temperature.

12. The method of claim 11, further comprising:
sensing air flow through the turbocharger compressor; and
detecting an air flow restriction based on a change in the air flow.

13. The method of claim 12, further comprising: selectively adjusting the boost pressure set point based on the air flow restriction.

14. The method of claim 11, further comprising: calibrating the compressor pressure ratio look-up table based on sensed turbocharger parameters.

15. The method of claim 11, further comprising: selectively updating the boost pressure set point based on sensed turbocharger parameters.

* * * * *